United States Patent [19]

Baumann et al.

[11] Patent Number: 4,759,849
[45] Date of Patent: Jul. 26, 1988

[54] PROCESS AND A DEVICE FOR THE TREATMENT, BY MEANS OF OZONE, OF FEED WATER FOR REVERSE OSMOSIS

[75] Inventors: Hans Baumann, Staretschwil; Hans-Peter Klein, Rieden b. Baden; Samuel Stucki, Nussbaumen, all of Switzerland

[73] Assignee: BBC Brown Boveri AG, Baden, Switzerland

[21] Appl. No.: 24,006

[22] Filed: Mar. 10, 1987

[30] Foreign Application Priority Data

Nov. 3, 1986 [CH] Switzerland .......................... 996/86

[51] Int. Cl.⁴ ............................................ B01D 13/00
[52] U.S. Cl. .................................. 210/652; 210/195.2; 210/259
[58] Field of Search ................. 210/195.2, 321.1, 259, 210/433.2, 760, 652

[56] References Cited

U.S. PATENT DOCUMENTS 4,595,498  6/1986  Cohen et al. ................. 210/195.2 X Primary Examiner—Frank Spear
Attorney, Agent, or Firm—Oblon, Fisher, Spivak, McClelland & Maier

[57] ABSTRACT

The feed water for a reverse osmosis device (7) is treated, by means of ozone, by being passed through a mixing vessel (4), in which the charging with ozone is carried out, a direct contact time container (5), and a residual-ozone destruction vessel (6) into the reverse osmosis device (7). At the permeate outlet (9) of the latter, part of the stream is branched off and fed, for charging with ozone, into an electrolysis cell (2) which is provided with a solid electrolyte, and fed back into the mixing vessel (4).

2 Claims, 1 Drawing Sheet

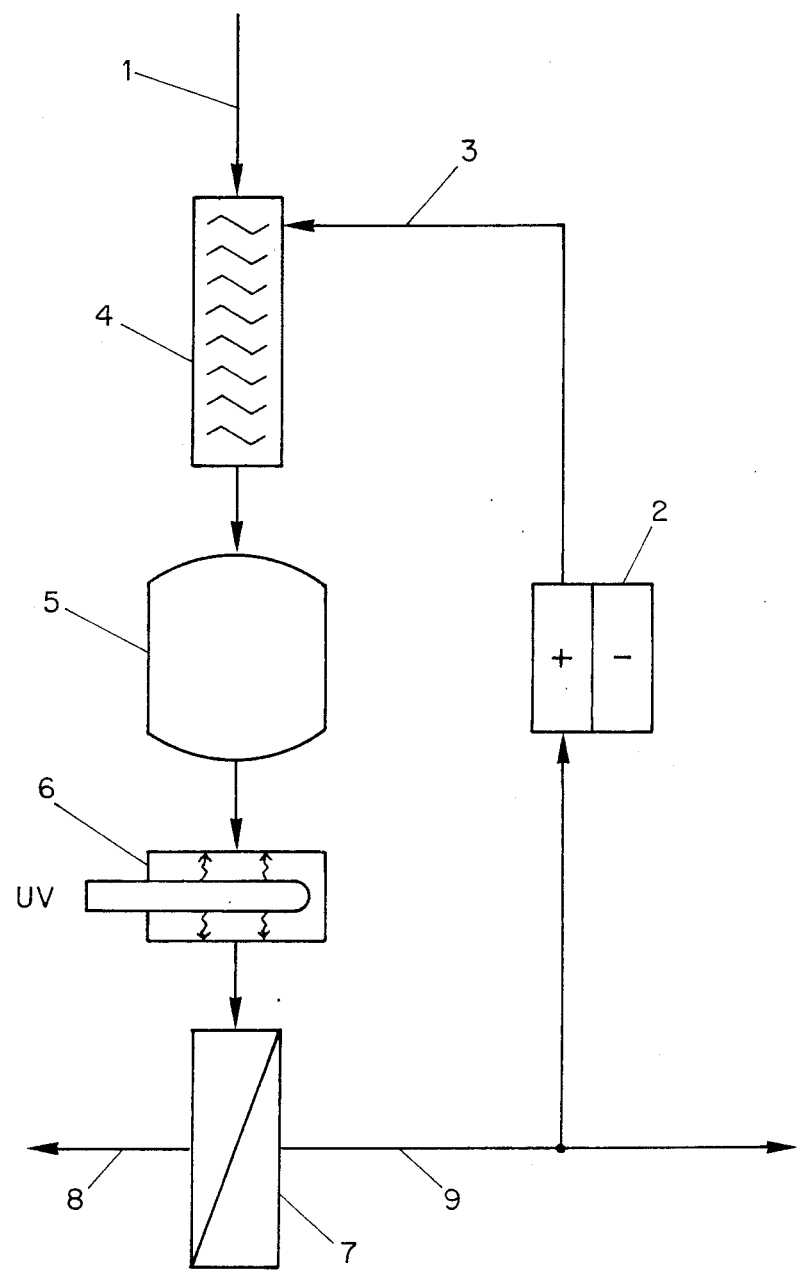

PROCESS AND A DEVICE FOR THE TREATMENT, BY MEANS OF OZONE, OF FEED WATER FOR REVERSE OSMOSIS

The invention relates to a process and a device for the treatment, by means of ozone, of feed water for reverse osmosis.

In the reverse osmosis, the formation of covering coatings ("fouling"), which can impair operation until breakdown occurs, is observed on the surface of the membranes in the course of time. It is known that the formation of this type of detrimental covering coatings can be reduced by adding ozone to the feed water (untreated water) (cf. Lozier and Siska, Journal AWWA, 1985, p. 60).

The electrolytic generation of ozone in cells with a solid electrolyte is known (cf. U.S. Pat. No. 4,416,747 and H.-P. Klein and S. Stucki, "The Production of Ozone by Electrolysis and its Application in High Purity Water Systems", Conference Proceedings 7th Ozone World Congress, 9–12 Sept. 1985, Tokyo).

The invention has the object of providing a simple process and a corresponding device for the treatment, by means of ozone, of feed water for reverse osmosis, which process can also be used in a simple fashion in existing plants.

The invention is described with reference to an illustrative embodiment which is described in further detail by a drawing.

The said drawing shows a flowchart of the process along with the most important elements of the device.

1 is the untreated-water inlet of the plant. 2 represents an electrolysis cell which is provided with a solid organic electrolyte (membrane). The anode and cathode sides are indicated by + and − signs respectively. 3 is the ozone inlet into the mixing vessel 4 through which the feed water flows. 5 represents a direct contact time container, and a vessel 6 for destruction of residual ozone follows thereafter. In the present case, this destruction of residual ozone is accomplished by means of a UV radiation source, whose radiation is indicated by wavy arrows. 7 is the actual device for reverse osmosis, which accomplishes the partition into concentrate and permeate. 8 represents the concentrate discharge, and 9 represents the permeate discharge. Part of the permeate stream is branched off and fed to the anode side of the $O_3$ electrolysis cell 2.

ILLUSTRATIVE EMBODIMENT

The feed water arriving via the untreated-water inlet 1 was mixed in the mixing vessel 4 with the ozone-containing so-called "rich water" supplied via the ozone inlet 3. The liquid was fed to a steel, 100 liter capacity direct contact time container 5. The liquid stream then passed through a residual-ozone destruction vessel 6, which was equipped with a UV lamp (Hg low-pressure lamp.) In this vessel, the excess ozone which was not needed for the intended reactions was removed. The device 7 for reverse osmosis comprised a Du Pont hollow-fiber module. Part of the permeate stream was branched off and fed to the anode side (+) of an electrolysis cell 2. This cell had an electrode surface area of 30 cm$^2$ and was operated at a current of 25 Å. The cell voltage was 3.48 V.

The remaining operating data were as follows:

|  | Amount of water (l/h) | Conductivity (μS/cm) | $O_3$ concentration (g/m$^3$) |
|---|---|---|---|
| Reverse osmosis device: |  |  |  |
| Inlet | 780 | 380 | 0 |
| Concentrate | 220 | 1850 | 0 |
| Permeate | 560 | 10 | 0 |
| $O_3$ cell: inlet | 30 | 10 | 0 |
| $O_3$ cell: outlet | 30 | 10 | 30 |
| Untreated-water inlet | 750 | 395 | 0 |
| Mixing vessel: outlet | 780 | 380 | 1 |
| Direct contact time container: |  |  |  |
| Outlet | 780 | 380 | 0.1 |

The residual-ozone destruction vessel 6 can alternatively be fitted with an activated-charcoal filter in place of a UV lamp. The reverse osmosis device 7 can alternatively have spiral-wound or plate-and-frame modules. Suitable membrane materials for these modules are cellulose acetate or composite materials.

We claim:

1. A process for effecting reverse osmosis with feed water charged with ozone which comprises feeding water to a mixing vessel, feeding ozone to said mixing vessel, feeding the effluent from the mixing vessel to a direct contact time container, feeding the effluent therefrom to a residual ozone destruction vessel, and feeding the effluent therefrom to a reverse osmosis device, the effluent from said reverse osmosis device constituting a concentrate stream and a permeate stream, feeding a portion of the permeate stream to an electrolysis cell with solid electrolyte, and feeding the ozone from said electrolysis cell to said mixing vessel.

2. A device for effecting reverse osmosis with feed water charged with ozone which comprises a feed water inlet to a mixing vessel, an ozone inlet to said mixing vessel, means connecting said mixing vessel to a direct contact time container, means connecting said container to a residual ozone destruction vessel, means connecting said destruction vessel to a reverse osmosis device, an outlet from said device for concentrate, an outlet from said device for permeate, means connecting the permeate outlet to an electrolysis cell with solid electrolyte, and means connecting the electrolysis cell to the ozone inlet of said mixing vessel.

* * * * *

UNITED STATES PATENT AND TRADEMARK OFFICE
CERTIFICATE OF CORRECTION

PATENT NO. : 4,759,849
DATED       : Jul. 26, 1988
INVENTOR(S) : Hans BAUMANN, et al.

It is certified that error appears in the above-identified patent and that said Letters Patent is hereby corrected as shown below:

On the title page

The Foreign Application Priority Data should be corrected as follows:

-- Mar. 11, 1986 [CH]   Switzerland ............... 996/86 --

Signed and Sealed this

Fourteenth Day of March, 1989

Attest:

DONALD J. QUIGG

*Attesting Officer*    *Commissioner of Patents and Trademarks*